United States Patent
Chen et al.

(10) Patent No.: US 10,284,084 B2
(45) Date of Patent: May 7, 2019

(54) POWER CONTROL CIRCUIT AND METHOD THEREOF

(71) Applicant: RICHWAVE TECHNOLOGY CORP., Taipei (TW)

(72) Inventors: Chih-Sheng Chen, Taipei (TW); Sheng-Tsung Wang, Taipei (TW)

(73) Assignee: RichWave Technology Corp., Taipei (TW)

(*) Notice: Subject to any disclaimer, the term of this patent is extended or adjusted under 35 U.S.C. 154(b) by 0 days.

(21) Appl. No.: 15/844,598

(22) Filed: Dec. 17, 2017

(65) Prior Publication Data
US 2018/0294718 A1   Oct. 11, 2018

(30) Foreign Application Priority Data

Apr. 5, 2017  (TW) .............................. 106111404 A

(51) Int. Cl.
*H02M 3/156* (2006.01)
*G05F 1/565* (2006.01)
*G05F 1/575* (2006.01)
*G05F 1/46* (2006.01)

(52) U.S. Cl.
CPC ............. *H02M 3/156* (2013.01); *G05F 1/468* (2013.01); *G05F 1/565* (2013.01); *G05F 1/575* (2013.01); *H02M 2003/1566* (2013.01)

(58) Field of Classification Search
CPC ........... G05F 1/468; G05F 1/565; G05F 1/575
USPC ....... 323/242, 243, 274, 281, 284, 288, 299, 323/300, 303; 327/72, 73; 361/18
See application file for complete search history.

(56) References Cited

U.S. PATENT DOCUMENTS

| | | | | |
|---|---|---|---|---|
| 6,114,845 A * | 9/2000 | Capici | ........................ | G05F 3/30 323/281 |
| 6,177,785 B1 * | 1/2001 | Lee | .......................... | G05F 3/247 323/281 |
| 7,167,054 B1 | 1/2007 | Dening et al. | | |
| 7,456,619 B2 * | 11/2008 | Sasaki | ........................ | G05F 1/56 323/268 |
| 7,557,550 B2 * | 7/2009 | Mellachurvu | ........... | G05F 1/575 323/281 |
| 7,804,284 B1 * | 9/2010 | Wong | ........................ | G05F 1/46 323/269 |

(Continued)

FOREIGN PATENT DOCUMENTS

| | | |
|---|---|---|
| TW | 201321920 A1 | 6/2013 |
| TW | 201610635 A | 3/2016 |
| WO | WO 2014137331 A1 | 9/2014 |

*Primary Examiner* — Gary A Nash
(74) *Attorney, Agent, or Firm* — Winston Hsu

(57) ABSTRACT

A power control circuit provides a supply voltage, and includes a voltage regulating circuit and a signal selecting circuit. The voltage regulating circuit is coupled to a power supply voltage and the output end of the power control circuit, and receives a first control signal for outputting the supply voltage. The signal selecting circuit has a first input end, a second input end and a third input end. The first input end of the signal selecting circuit receives a first input signal, the second input end of the signal selecting circuit receives a second input signal, and the third input end of the signal selecting circuit receives a second control signal. The first input signal is related to the power supply voltage. One of the first input signal and the second input signal is chosen and outputted as the first control signal according to the second control signal.

18 Claims, 8 Drawing Sheets

(56) References Cited

U.S. PATENT DOCUMENTS

| | | | |
|---|---|---|---|
| 8,089,306 B1* | 1/2012 | Wright | G06F 1/24 |
| | | | 327/143 |
| 8,750,812 B2 | 6/2014 | Pedersen et al. | |
| 2005/0099224 A1* | 5/2005 | Itoh | G05F 1/565 |
| | | | 327/541 |
| 2009/0027018 A1* | 1/2009 | Garrard | G05F 1/465 |
| | | | 323/281 |
| 2011/0248696 A1* | 10/2011 | Tichy | H02M 3/1588 |
| | | | 323/288 |
| 2014/0139199 A1* | 5/2014 | Khlat | H02M 3/1582 |
| | | | 323/282 |
| 2016/0085250 A1* | 3/2016 | Luo | G05F 1/56 |
| | | | 323/281 |

* cited by examiner

POWER CONTROL CIRCUIT AND METHOD THEREOF

CROSS REFERENCE TO RELATED APPLICATION

The present application is based on, and claims priority from, Taiwan application serial NO. 106111404, filed on Apr. 5, 2017, the disclosure of which is hereby incorporated by reference herein in its entirety.

TECHNICAL FIELD

The present disclosure relates to a power control circuit and a power control method; in particular, to a power control circuit and a power control method that can always provide a stable supply voltage even though the battery voltage of a portable electronic device varies or the control signal which is sent from a baseband circuit of the portable electronic device changes.

BACKGROUND

A portable electronic device usually has a power control circuit. This power control circuit is responsible for providing a supply voltage to a power amplifier that is configured to amplify and transmit signals, wherein this supply voltage is corresponding to a control signal which is sent from a baseband circuit of the portable electronic device. Based on different operation requirements of the portable electronic device, the control signal which is sent from the baseband circuit of the portable electronic device may sometimes be large and sometimes be small. However, the battery voltage of the portable electronic device will gradually decrease during the operation of the portable electronic device. If the control signal which is sent from the baseband circuit of the portable electronic device is large, the battery voltage of the portable electronic device may be insufficient to allow the power control circuit to provide a supply voltage which can correspond to the control signal. As a result, the power control circuit may not work normally.

SUMMARY

The present disclosure provides a power control circuit that is used to provide a supply voltage from its output end. This power control circuit includes a voltage regulating circuit and a signal selecting circuit. The voltage regulating circuit is coupled to a power supply voltage and the output end of the power control circuit. The voltage regulating circuit receives a first control signal, and outputs the supply voltage to the output end of the power control circuit according to the first control signal. The signal selecting circuit has a first input end, a second input end a third input end and a output end. The first input end of the signal selecting circuit receives a first input signal, the second input end of the signal selecting circuit receives a second input signal, and the third input end of the signal selecting circuit receives a second control signal. The first input signal is related to the power supply voltage. One of the first input signal and the second input signal is chosen as the first control signal according to the second control signal, and this first control signal is outputted from the output end of the signal selecting circuit.

The present disclosure also provides a power control method. This power control method can be applied to a power control circuit. This power control circuit outputs a supply voltage from its output end and includes a voltage regulating circuit and a signal selecting circuit, wherein the voltage regulating circuit is coupled to a power supply voltage and the output end of the power control circuit. The power control method mainly includes: through the voltage regulating circuit, receiving a first control signal and outputting the supply voltage to the output end of the power control circuit according to the first control signal; through the signal selecting circuit, receiving a first input signal, a second input signal and a second control signal, wherein the first input signal is related to the power supply voltage; and through the signal selecting circuit, choosing one of the first input signal and the second input signal as the first control signal according to the second control signal and outputting the first control signal.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION

The aforementioned illustrations and following detailed descriptions are exemplary for the purpose of further explaining the scope of the present disclosure. Other objectives and advantages related to the present disclosure will be illustrated in the subsequent descriptions and appended drawings. In these drawings, like references indicate similar elements.

There are several embodiments provided for illustrating the power control circuit and the power control method in the present disclosure, but it is not limited thereto.

One Embodiment of the Power Control Circuit

Figure 1:
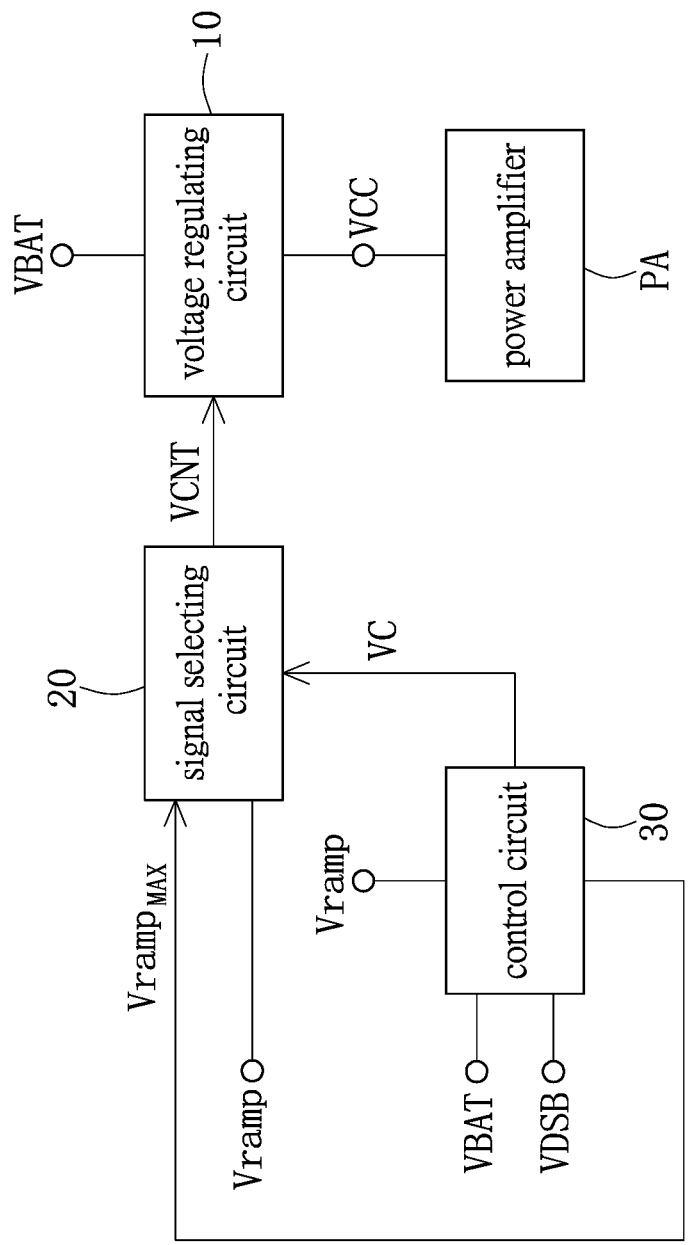
FIG. 1 shows a block diagram of a power control circuit according to one embodiment of the present disclosure.

Referring to FIG. 1, a block diagram of a power control circuit according to one embodiment of the present disclosure is shown. The power control circuit in the present disclosure is for providing a supply voltage. For example, the power control circuit can be configured in a portable electronic device, such as a mobile phone, to provide a supply voltage VCC according to a control signal which is sent from a baseband circuit of the portable electronic device to a power amplifier that is responsible for amplifying and transmitting signals.

As shown in FIG. 1, the power control circuit in this embodiment at least includes a voltage regulating circuit 10 and a signal selecting circuit 20. The voltage regulating circuit 10 is coupled to a power supply voltage, such as the battery voltage VBAT of a portable electronic device, and to an output end of the power control circuit. The signal selecting circuit 20 has a first input end, a second input end, a third input end and an output end.

The working principle of the power control circuit in this embodiment is revealed in the following descriptions. For ease of illustration, in the following descriptions, the power control circuit is applied to a mobile phone but it is not limited thereto.

In this embodiment, the voltage regulating circuit 10 outputs a supply voltage VCC to the output end of the power control circuit mainly according to a first control signal VCNT. This first control signal VCNT is sent from the signal selecting circuit 20. For example, the signal selecting circuit 20 can be a transmission circuit.

The first input end of the signal selecting circuit 20 is configured to receive a first input signal $Vramp_{MAX}$, and the second input end of the signal selecting circuit 20 is configured to receive a second input signal Vramp. The signal selecting circuit 20 chooses one of the first input signal $Vramp_{MAX}$ and the second input signal Vramp as the first control signal VCNT. The second input signal Vramp is sent from the baseband circuit of the mobile phone. According to different operation requirements of the mobile phone, the second input signal may be large and may also be small. Generally, the signal selecting circuit 20 chooses the second input signal Vramp as the first control signal VCNT and outputs the first control signal VCNT, such that the voltage regulating circuit 10 provides a supply voltage VCC according to the first control signal VCNT to the power amplifier PA which is responsible for amplifying and transmitting signals. However, during the operation of the mobile device, the battery voltage VBAT will gradually decrease. In this case, if the second input signal Vramp which is sent from the baseband circuit of the mobile phone is larger than the battery voltage VBAT, the battery voltage VBAT may be insufficient to make the voltage regulating circuit 10 able to provide the supply voltage VCC corresponding to the large second input signal Vramp. As a result, the power control circuit cannot work normally.

To avoid that, the power control circuit in this embodiment further includes a control circuit 30. The control circuit 30 has a first input end, a second input end, a third input end, a first output end and a second output end. In FIG. 1, the first input end of the control circuit 30 is coupled to the battery voltage VBAT, the second input end of the control circuit 30 receives a predetermined voltage VDSB, and the third input end of the control circuit 30 receives the second input signal Vramp. The control circuit 30 calculates the first input signal $Vramp_{MAX}$ according to the battery voltage VBAT and the predetermined voltage VDSB. This first input signal $Vramp_{MAX}$ is outputted from the first output end of the control circuit 30 to the signal selecting circuit 20. After that, a second control signal VC is outputted from the second output end of the control circuit 30 according to the first input signal $Vramp_{MAX}$ and the second input signal Vramp.

The signal selecting circuit 20 is controlled by the second control signal VC to choose one of the first input signal $Vramp_{MAX}$ and the second input signal Vramp as the first control signal VCNT and to output this first control signal VCNT.

In the following descriptions, how the control circuit 30 calculates the first input signal $Vramp_{MAX}$ according to the battery voltage VBAT and the predetermined voltage VDSB and how the control circuit 30 outputs the second control signal VC for controlling the signal selecting circuit 20 to choose one of the first input signal $Vramp_{MAX}$ and the second input signal Vramp as the first control signal VCNT are illustrated.

Figure 2:
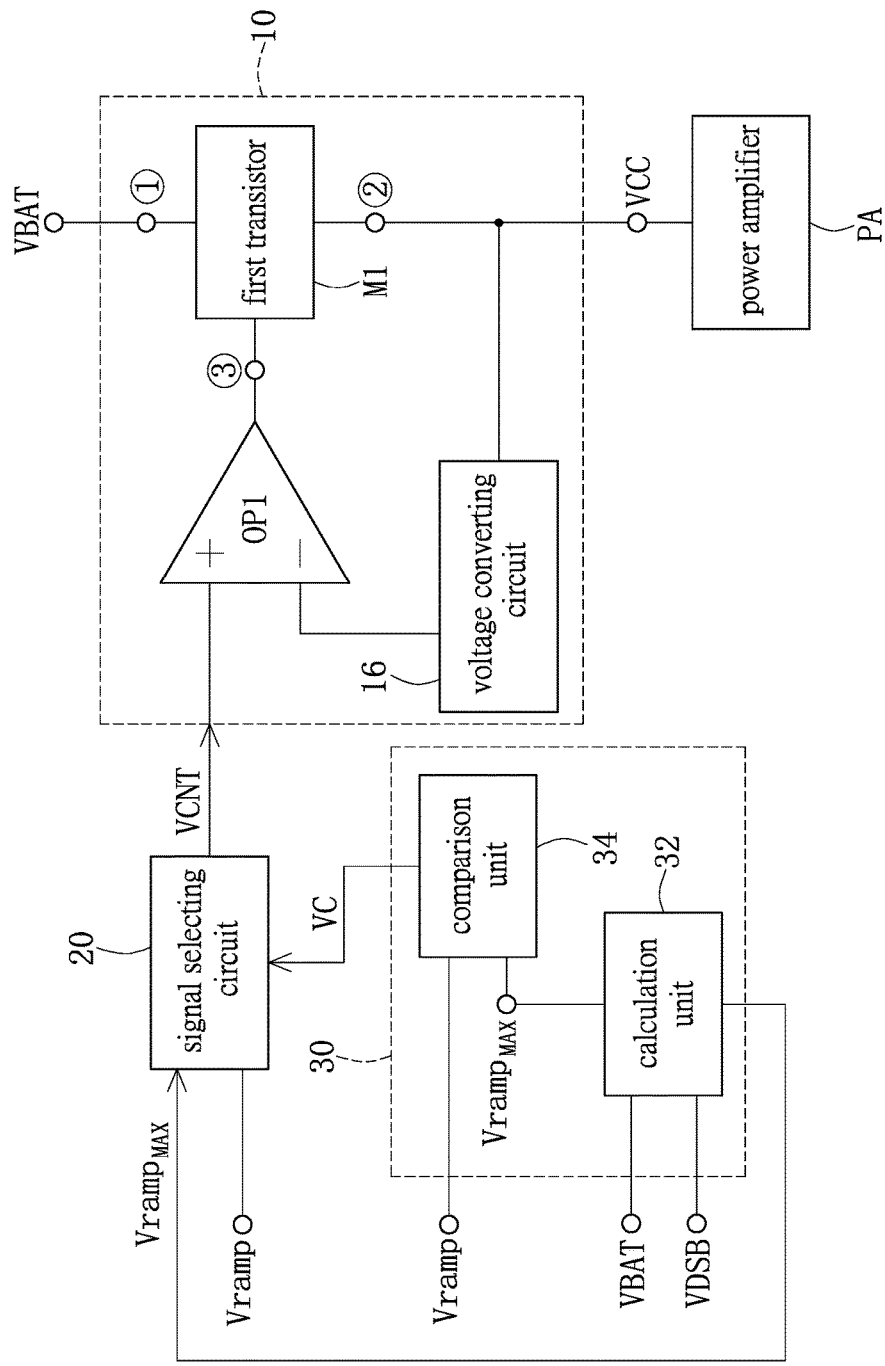
FIG. 2 shows a block diagram of a power control circuit according to another embodiment of the present disclosure.

Referring to FIG. 2, a block diagram of a power control circuit according to another embodiment of the present disclosure is shown.

As shown in FIG. 2, the voltage regulating circuit 10 mainly includes a first transistor M1, a first operational amplifier OP1 and the voltage converting circuit 16, and the control circuit 30 mainly includes a calculation unit 32 and a comparison unit 34. In the voltage regulating circuit 10, a first end of the first transistor M1 is coupled to the battery voltage VBAT, and a second end of the first transistor M1 is coupled to the output end of the power control circuit. A non-inverting input end of the first operational amplifier OP1 is coupled to the output end of the signal selecting circuit 20, and an output end of the first operational amplifier OP1 is coupled to a third end of the first transistor M1. Additionally, the voltage converting circuit 16 is coupled between an inverting input end of the first operational amplifier OP1 and the output end of the power control circuit. In the control circuit 30, the comparison unit 34 is coupled between the calculation unit 32 and the signal selecting circuit 20.

For ease of illustration, in FIG. 2, the first end of the first transistor M1 is marked by $\hat{1}$, the second end of the first transistor M1 is marked by $\hat{2}$, and the third end of the first transistor M1 is marked by $\hat{3}$.

Further description, the calculation unit 32 calculates the first input signal $Vramp_{MAX}$ according to the battery voltage VBAT and the predetermined voltage VDSB, and thus the first input signal $Vramp_{MAX}$ is related to the battery voltage VBAT. To calculate the first input signal $Vramp_{MAX}$, the difference of the battery voltage VBAT and the predetermined voltage VDSB is divided by the converting factor of the voltage converting circuit 16, and then the quotient is the first input signal $Vramp_{MAX}$. In other words, the calculation unit 32 calculates the first input signal $Vramp_{MAX}$ based on the following Equation 1.

$$Vramp_{MAX}=(VBAT-VDSB)/H(S) \qquad \text{(Equation 1)}$$

In the Equation 1, "$Vramp_{MAX}$" indicates the voltage of the first input signal $Vramp_{MAX}$, "VDSB" indicates a predetermined voltage, and "H(S)" indicates the converting factor of the voltage converting circuit 16.

According to the voltage regulating circuit 10 in FIG. 2 and the Equation (1), the predetermined voltage VDSB should be the turn-on voltage of the first transistor M1. The maximum of the output voltage of the voltage regulating circuit 10 can be obtained after subtracting the turn-on voltage of the first transistor M1 from the battery voltage VBAT.

Also, according to FIG. 2, the supply voltage VCC provided by the voltage regulating circuit 10 can be obtained by multiplying the first control signal VCNT received by the non-inverting input end of the first operational amplifier OP1 with the converting factor of the voltage converting circuit 16, which is H(S). In other words, the supply voltage VCC provided by the voltage regulating circuit 10 can be represented by the following Equation 2.

$$VCC = VCNT * H(S) \quad \text{(Equation 2)}$$

In the Equation 2, "VCC" indicates the supply voltage VCC provided by the voltage regulating circuit 10, "VCNT" indicates the voltage of the first control signal VCNT outputted from the signal selecting circuit 20, and "H(S)" indicates the converting factor of the voltage converting circuit 16.

From the above, the maximum of the supply voltage VCC provided by the voltage regulating circuit 10 can be obtained after subtracting the turn-on voltage of the first transistor M1 from the battery voltage VBAT o according to FIG. 2. In addition, according to the Equation 1 and the Equation 2, the maximum of the first control signal VCNT received by the non-inverting input end of the first operational amplifier OP1 is the first input signal $Vramp_{MAX}$ obtained based on the Equation 1.

In this manner, according to the variable battery voltage VBAT, the calculation unit 32 in the control circuit 30 can calculate the maximum of the first control signal VCNT received by the non-inverting input end of the first operational amplifier OP1, which is the first input signal $Vramp_{MAX}$.

After that, the comparison unit 34 in the control circuit 30 compares the first input signal $Vramp_{MAX}$ and the second input signal Vramp. As mentioned, the signal selecting circuit 20 will choose one of the first input signal $Vramp_{MAX}$ and the second input signal Vramp as the first control signal VCNT. Thus, the reason why the comparison unit 34 compares the first input signal $Vramp_{MAX}$ and the second input signal Vramp is that, it is necessary to determine whether the second input signal Vramp which is sent from the baseband circuit of the mobile phone is larger than the maximum value of the first control signal VCNT received by the non-inverting input end of the first operational amplifier OP1, which is the first input signal $Vramp_{MAX}$.

When the first input signal $Vramp_{MAX}$ determines that the second input signal Vramp which is sent from the baseband circuit of the mobile phone is smaller than the first input signal $Vramp_{MAX}$, it indicates that the battery voltage VBAT is currently sufficient for the voltage regulating circuit 10 to provide a supply voltage VCC corresponding to the second input signal Vramp. In this case, the signal selecting circuit 20 is controlled by the second control signal VC, which is from the comparison unit 34, to output the second input signal Vramp as the first control signal VCNT. As a result, the voltage regulating circuit 10 provides a supply voltage VCC corresponding to the second input signal Vramp. This supply voltage VCC equals to the product of the first control signal VCNT, which is the second input signal Vramp, and the converting factor of the voltage converting circuit 16.

When the first input signal $Vramp_{MAX}$ determines that the second input signal Vramp which is sent from the baseband circuit of the mobile phone is larger than or equal to the first input signal $Vramp_{MAX}$, it indicates that the battery voltage VBAT is currently insufficient for the voltage regulating circuit 10 to provide a supply voltage VCC corresponding to the second input signal Vramp. In this case, the signal selecting circuit 20 is controlled by the second control signal VC, which is from the comparison unit 34, to output the first input signal $Vramp_{MAX}$ as the first control signal VCNT. As a result, the voltage regulating circuit 10 provides a supply voltage VCC corresponding to the first input signal $Vramp_{MAX}$. This supply voltage VCC equals to the product of the first control signal VCNT, which is the first input signal $Vramp_{MAX}$, and the converting factor of the voltage converting circuit 16.

Therefore, when the second input signal Vramp which is sent from the baseband circuit of the mobile phone is larger than or equal to the first input signal $Vramp_{MAX}$, the signal selecting circuit 20 will be controlled by the second control signal VC coming from the comparison unit 34 to output the first input signal $Vramp_{MAX}$ as the first control signal VCNT. According to the above descriptions, the first input signal $Vramp_{MAX}$ can be adjusted according to the varying battery voltage VBAT. Thus, even when the second input signal Vramp which is sent from the baseband circuit of the mobile phone is larger, it is less likely for the power control circuit in this embodiment to work abnormally because of the insufficient battery voltage VBAT.

Figure 3:
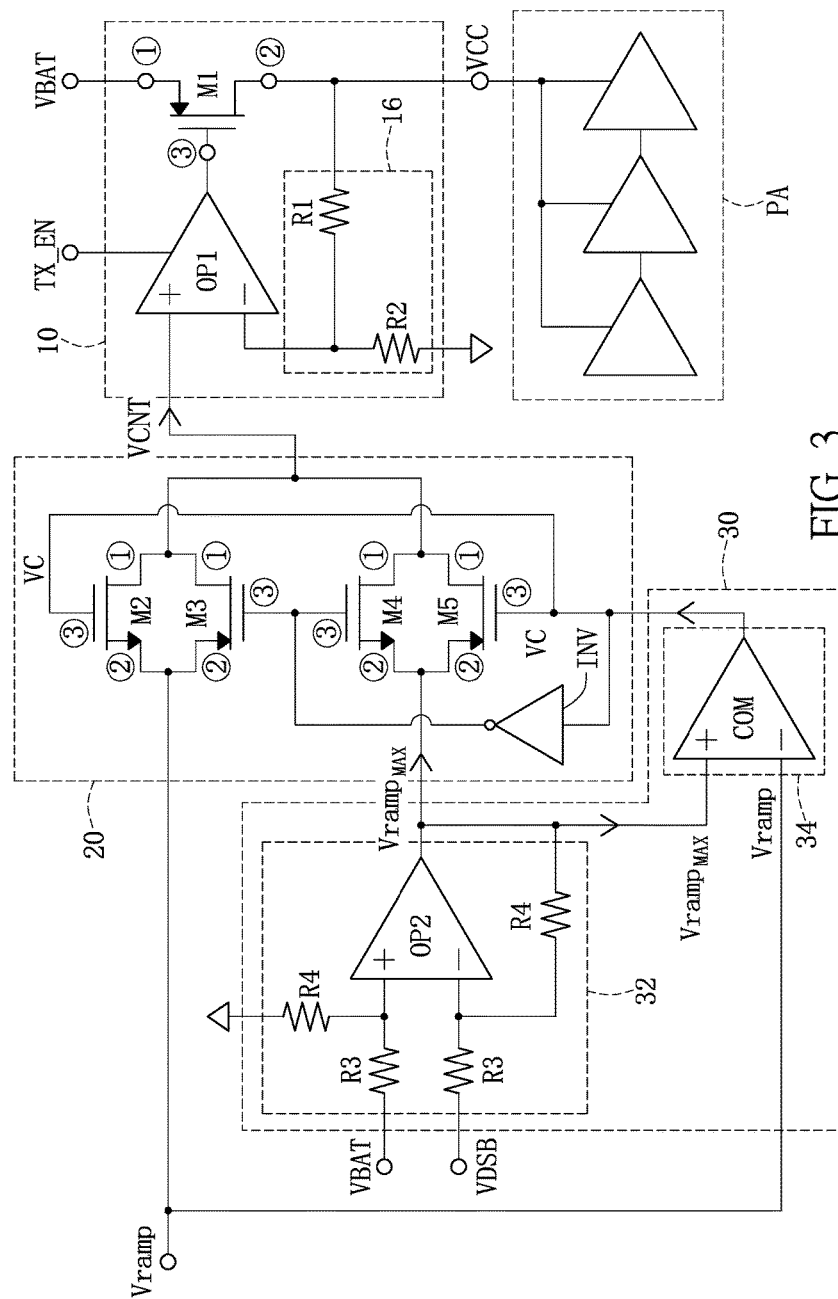
FIG. 3 shows a circuit diagram of a power control circuit according to one embodiment of the present disclosure.

There are examples provided to illustrate the circuit diagram and the working principle of the voltage regulating circuit 10, the signal selecting circuit 20 and the control circuit 30 of the power control circuit in this embodiment; however, the implementations of the voltage regulating circuit 10, the signal selecting circuit 20 and the control circuit 30 of the power control circuit in this embodiment are not thus restricted. Referring to FIG. 3, a circuit diagram of a power control circuit according to one embodiment of the present disclosure is shown.

As shown in FIG. 3, in the voltage regulating circuit 10, the first transistor M1 is a field effect transistor. For example, the first transistor M1 can be a PMOS transistor, the first end of the first transistor M1 is a source, the second end of the first transistor M1 is a drain, and the third end of the first transistor M1 is a gate. The voltage converting circuit 16 includes a first resistor R1 and a second resistor R2. One end of the first resistor R1 is coupled to the inverting input end of the first operational amplifier OP1, and the other end of the first resistor R1 is coupled to the second end of the first transistor M1. One end of the second resistor R2 is coupled to the inverting input end of the first operational amplifier OP1, and the other end of the second resistor R2 is coupled to a reference voltage, such as a grounding voltage. In FIG. 3, the circuit configuration consisted of the first operational amplifier OP1, the first resistor R1 and the second resistor R2 can be considered a non-inverting closed-loop amplifier. Thus, the voltage converting circuit 16 can have various converting factors by adjusting the resistances of the first resistor R1 and the second resistor R2. For example, if the resistance of the first resistor R1 is designed to be equal to the resistance of the second resistor R2, then the converting factor of the voltage converting circuit 16 is 2.

The calculation unit 32 in the control circuit 30 includes a second operational amplifier OP2. According to FIG. 3, a non-inverting input end of the second operational amplifier OP2 is coupled to the battery voltage VBAT through a third resistor R3 and is also coupled to a reference voltage, such as a grounding voltage, through a fourth resistor R4. In addition, an inverting input end of the second operational amplifier OP2 is coupled to the predetermined voltage VDSB through another third resistor R3 and is also coupled to an output end of the second operational amplifier OP2 through another fourth resistor R4. Moreover, the first input signal $Vramp_{MAX}$ is outputted from the output end of the second operational amplifier OP2.

The comparison unit 34 in the control circuit 30 includes a comparator COM. According to FIG. 3, a first input end of the comparator COM, such as a non-inverting input end, is coupled to the output end of the second operational amplifier OP2, and a second input end of the comparator COM, such as an inverting input end, is coupled to the second input signal Vramp. The comparator COM compares the first input signal $Vramp_{MAX}$ and the second input signal Vramp, accordingly generates a second control signal VC, and transmits this second control signal VC to the signal selecting circuit 20.

The signal selecting circuit 20 includes a second transistor M2 and a third transistor M3. The second end of the second transistor M2 and the second end of the third transistor M3 are coupled together to receive the second input signal Vramp, and the first end of the second transistor M2 and the first end of the third transistor M3 are coupled together and further coupled to the non-inverting input end of the first operational amplifier OP1. In addition, the signal selecting circuit 20 further includes a fourth transistor M4 and a fifth transistor M5. The second end of the fourth transistor M4 and the second end of the fifth transistor M5 are coupled together to receive the first input signal $Vramp_{MAX}$, and the first end of the fourth transistor M4 and the first end of the fifth transistor M5 are coupled together and further coupled to the non-inverting input end of the first operational amplifier OP1. Moreover, the third end of the second transistor M2 and the third end of the fifth transistor M5 are coupled together to receive the second control signal VCNT, and the third end of the third transistor M3 and the third end of the fourth transistor M4 are coupled together to receive the second control signal VC that has been inverted by an inverter INV.

In this embodiment, the second transistor M2 and the fourth transistor M4 can be first-type field effect transistors, such as NMOS transistors, and the third transistor M3 and the fifth transistor M5 can be second-type field effect transistors, such as PMOS transistors. The first ends of the second transistor M2, the third transistor M3, the fourth transistor M4 and the fifth transistor M5 are drains, the second ends of the second transistor M2, the third transistor M3, the fourth transistor M4 and the fifth transistor M5 are sources, and the third ends of the second transistor M2, the third transistor M3, the fourth transistor M4 and the fifth transistor M5 are gates. For ease of illustration, in FIG. 3, the first ends of the first transistor M1, the second transistor M2, the third transistor M3, the fourth transistor M4 and the fifth transistor M5 are marked by 1̂, the second ends of the first transistor M1, the second transistor M2, the third transistor 2̂, the fourth transistor M4 and the fifth transistor M5 are marked by 0, and the third ends of the first transistor M1, the second transistor M2, the third transistor M3, the fourth transistor M4 and the fifth transistor M5 are marked by 3̂.

According to the above, the circuit configuration consisted of the second transistor M2, the third transistor M3, the fourth transistor M4 and the fifth transistor M5 can be considered two CMOS transmission gates. As mentioned, after the comparator COM compares the first input signal $Vramp_{MAX}$ and the second input signal Vramp, it will generate a second control signal VC and transmit this second control signal VC to the signal selecting circuit 20. For example, when the second input signal Vramp is larger than or equal to the first input signal $Vramp_{MAX}$, the second control signal VC coming from the comparator COM is at low level and the inverted second control signal VC is at high level. As a result, the second transistor M2 and the third transistor M3 are turned off and the fourth transistor M4 and the fifth transistor M5 are turned on, such that the first input signal $Vramp_{MAX}$ is transmitted to the non-inverting input end of the first operational amplifier OP1 through the fourth transistor M4 and the fifth transistor M5. Briefly, the first input signal $Vramp_{MAX}$ is chosen as the first control signal VCNT.

On the other hand, when the second input signal Vramp is smaller than the first input signal $Vramp_{MAX}$, the second control signal VC from the comparator COM is at high level and the inverted second control signal VC is at low level. As a result, the second transistor M2 and the third transistor M3 are turned on and the fourth transistor M4 and the fifth transistor M5 are turned off, such that the second input signal Vramp is transmitted to the non-inverting input end of the first operational amplifier OP1 through the second transistor M2 and the third transistor M3. Briefly, the second input signal Vramp is chosen as the first control signal VCNT.

Alternatively, when the second input signal Vramp is larger than or equal to the first input signal $Vramp_{MAX}$, the second control signal VC can be designed to be at high level, and when the second input signal Vramp is smaller than the first input signal $Vramp_{MAX}$, the second control signal VC can be designed to be at low level. In this case, the third transistor M3 and the fifth transistor M5 should be first-type field effect transistors, such as NMOS transistors, and the second transistor M2 and the fourth transistor M4 should be second-type field effect transistors, such as PMOS transistors.

In this embodiment, no matter which input signal is chosen as the first control signal VCNT, the first input signal $Vramp_{MAX}$ or the second input signal Vramp, and then is transmitted to the first operational amplifier OP1 driven by an enable signal TX_EN, the first control signal VCNT can be converted to an appropriate supply voltage VCC through the first operational amplifier OP1, the first resistor R1 and the second resistor R2 to the output end of the power control circuit.

Figure 5:
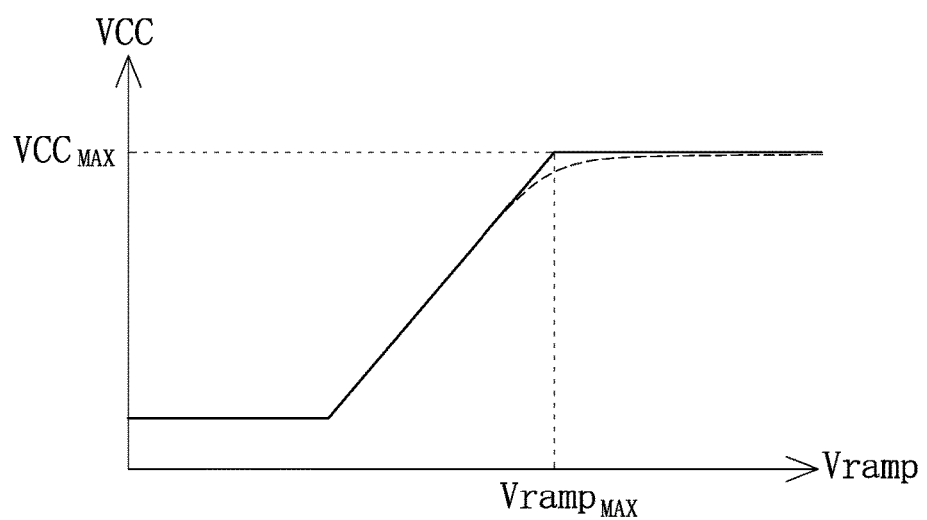
FIG. 5 shows a curve diagram showing the power control result of a traditional power control circuit and the power control result of the power control circuit provided by the present disclosure.

FIG. 5 shows a curve diagram showing the power control result of a traditional power control circuit and the power control result of the power control circuit provided by the present disclosure. In FIG. 5, the dotted line is a power control curve of a traditional power control circuit and the solid line is a power control curve of the power control circuit provided by each above mentioned embodiment.

As known, the power control curve determines the relationship between the supply voltage provided by the power control circuit and the input signal received by the power control circuit. As mentioned, the power control circuit provided by the present disclosure calculates the first input signal $Vramp_{MAX}$ which is the maximum value of the input signal that this power control circuit can support according to the varying battery voltage VBAT. Then, when the second input signal Vramp which is sent from the baseband circuit of the mobile phone is larger than or equal to the first input signal $Vramp_{MAX}$, the power control circuit provided by the present disclosure chooses the first input signal $Vramp_{MAX}$ as the input signal. Thus, it can be found in FIG. 5 that, compared with the power control curve of the traditional power control circuit, the power control curve of the power control circuit provided by the present disclosure has a better linearity. In other words, the power control curve of the power control circuit provided by the present disclosure is more predictable.

In the present disclosure, when the input signal of the power control circuit is the maximum value of the input signal that the power control circuit can support, which is the first input signal $Vramp_{MAX}$, the power control circuit outputs the maximum supply voltage that can be supported by the current battery voltage VBAT as expected, which is marked as $VCC_{MAX}$ in FIG. 5. Thus, the power control curve of the power control circuit provided by the present disclosure, which is the solid line, has a better linearity. However, for the traditional power control circuit, a feedback circuit is additionally configured at the output end of the power control circuit for determining whether the voltage required by the baseband circuit of the mobile phone can be supported by the current battery voltage VBAT. Thus, when the input signal is large and even approaching the maximum value of the input signal that the current battery voltage VBAT can support, it is hard for the traditional power control circuit to directly and immediately output the maximum supply voltage $VCC_{MAX}$. Thus, the power control curve of the traditional power control circuit, which is the dotted line, has a low linearity. In other words, the power control curve of the traditional power control circuit in FIG. 5 is low linearity and hard to predict.

One Embodiment of the Power Control Method

The power control method in this embodiment can be applied to the power control circuit of each above embodiment.

Figure 4A:
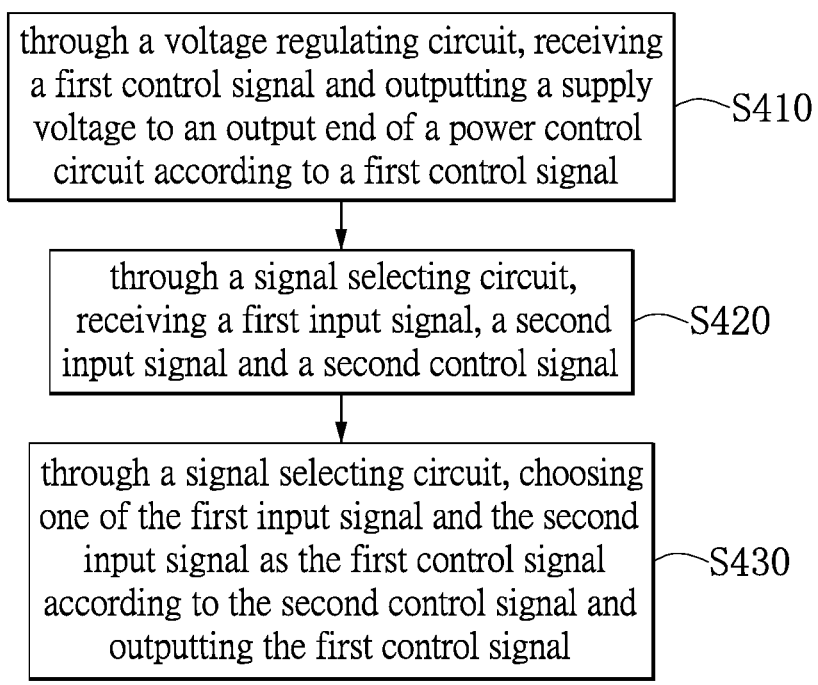
FIG. 4A shows a flow chart of a power control method according to one embodiment of the present disclosure.

Referring to FIG. 4A, a flow chart of a power control method according to one embodiment of the present disclosure is shown. The power control method mainly includes the following steps. In step S410, the voltage regulating circuit receives a first control signal, and outputs a supply voltage to an output end of the power control circuit according to the first control signal. In step S420, the signal selecting circuit receives a first input signal, a second input signal and a second control signal. In step S430, the signal selecting circuit chooses one of the first input signal and the second input signal as the first control signal according to the second control signal, and outputs the first control signal.

Figure 4B:
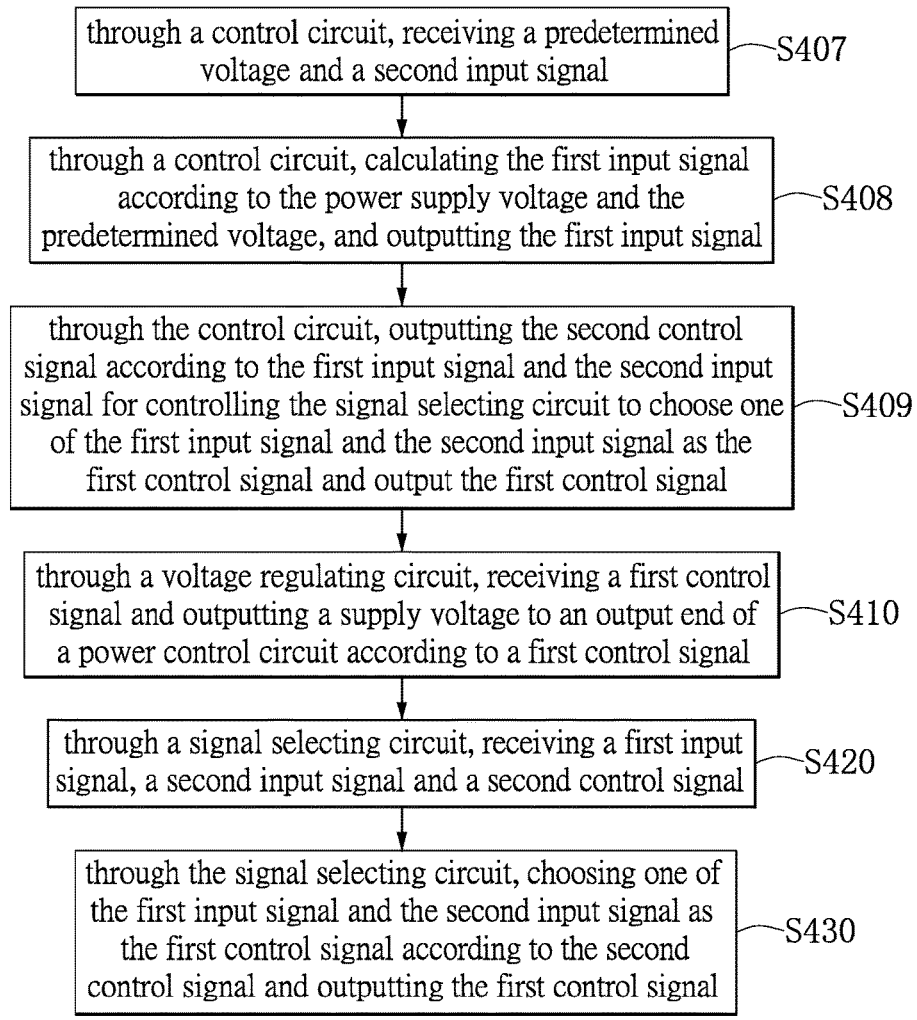
FIG. 4B shows a flow chart of a power control method according to another embodiment of the present disclosure.

In addition, referring to FIG. 4B, a flow chart of a power control method according to another embodiment of the present disclosure is shown.

Before step S410, the first control signal is obtained mainly by the following steps. In step S407, the control circuit receives a predetermined voltage and the second input signal. In step S408, the control circuit calculates the first input signal according to the predetermined voltage and the power supply voltage, such as the battery voltage of a portable electronic device or a mobile phone, and outputs the first input signal. In step S409, the control circuit outputs the second control signal according to the first input signal and the second input signal for controlling the signal selecting circuit to choose one of the first input signal and the second input signal as the first control signal.

Figure 4C:
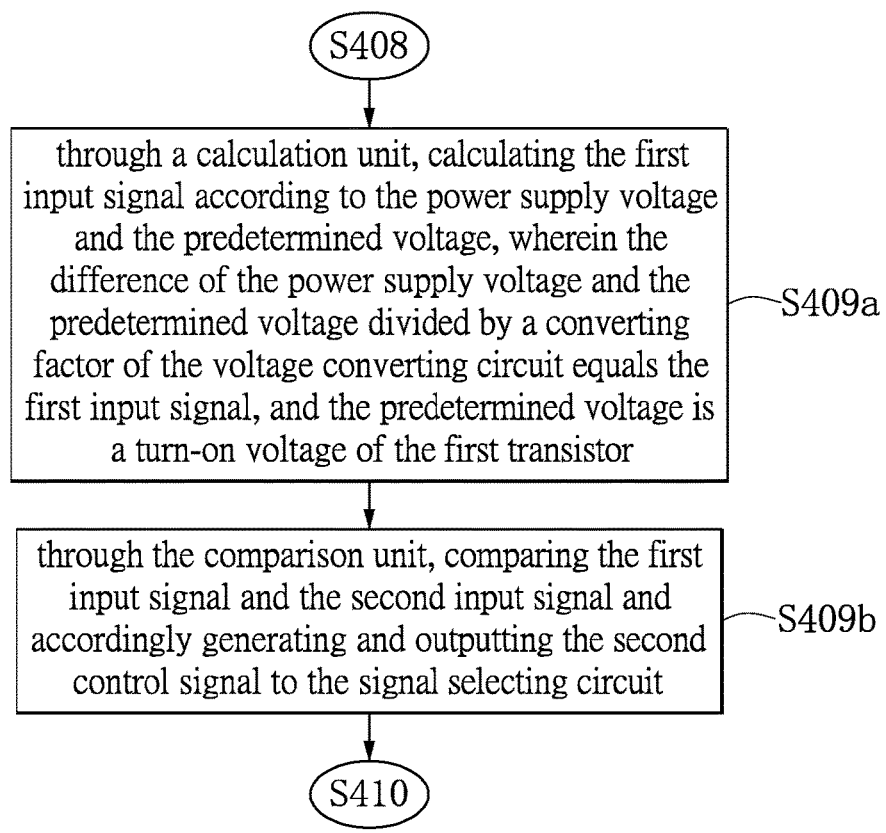
FIG. 4C shows a flow chart illustrating how to generate the second control signal in a power control method according to FIG. 4B.

FIG. 4C shows a flow chart illustrating how to generate the second control signal in a power control method according to FIG. 4B. As shown in FIG. 4C, the second control signal mentioned in step S409 is obtained mainly by the following steps. In step S409a, the calculation unit calculates the first input signal according to the battery voltage and the predetermined voltage. It should be noted that the first input signal equals to the quotient which is the difference of the battery voltage and the predetermined voltage divided by a converting factor of the voltage converting circuit, and that the predetermined voltage is a turn-on voltage of the first transistor. In step S409b, the comparison unit compares the first input signal and the second input signal, accordingly generates the second control signal, and transmits this second control signal to the signal selecting circuit.

Figure 4D:
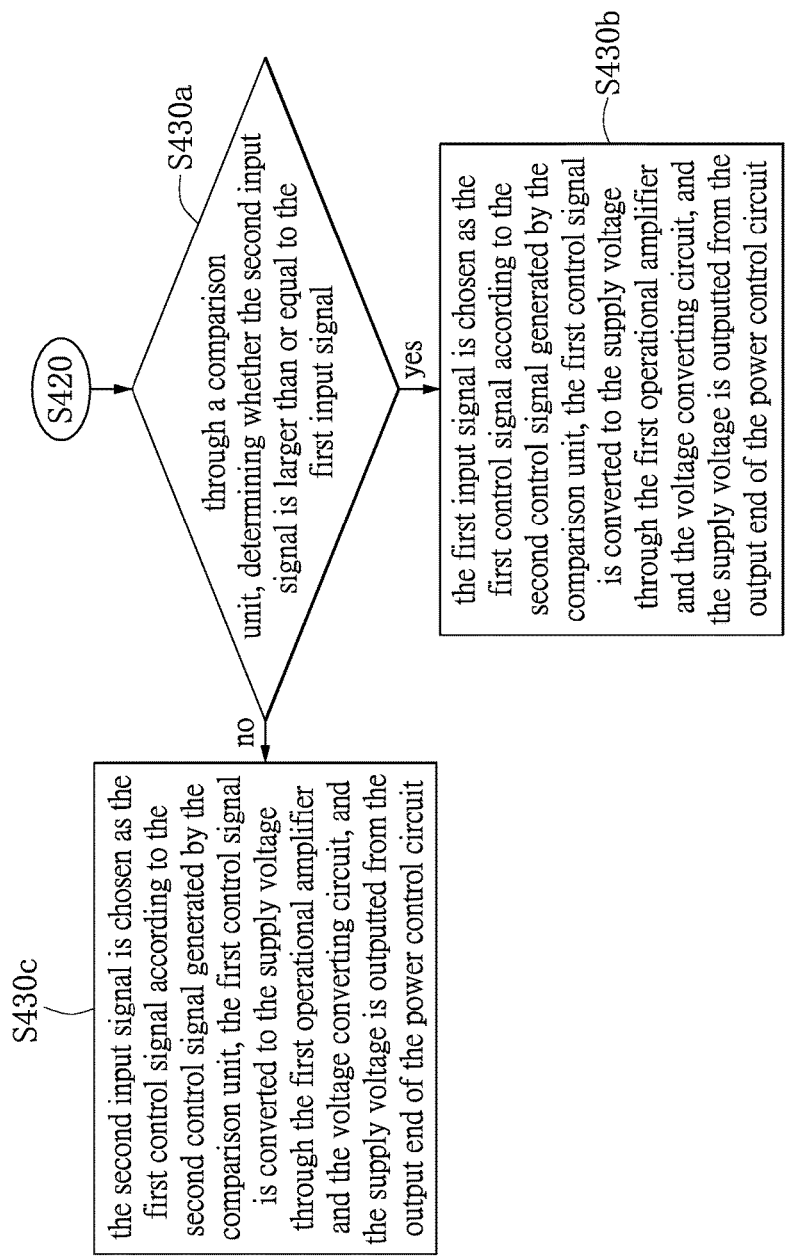
FIG. 4D shows a flow chart illustrating how to choose one of the first input signal and the second input signal as the first control signal according to the second control signal in a power control method according to FIG. 4B.

FIG. 4D shows a flow chart illustrating how to choose one of the first input signal and the second input signal as the first control signal according to the second control signal in a power control method according to FIG. 4B. As shown in FIG. 4D, step S430 is implemented mainly by the following steps. In step S430a, the comparison unit determines whether the second input signal is larger than or equal to the first input signal. In step S430b, when the second input signal is larger than or equal to the first input signal, the first input signal is chosen as the first control signal. This first control signal is converted to a supply voltage through the first operational amplifier and the voltage converting circuit, and then this supply voltage is transmitted to the output end of the power control circuit. In step S430c, when the second input signal is smaller than the first input signal, the second input signal is chosen as the first control signal. This first control signal is converted to a supply voltage through the first operational amplifier and the voltage converting circuit, and then this supply voltage is transmitted to the output end of the power control circuit.

To sum up, the power control circuit provided by the present disclosure tries to provide a stable supply voltage no matter the control signal which is sent from the baseband circuit of a portable electronic device varies. The advantage of the power control circuit provided by the present disclosure is that, when the control signal which is sent from the baseband circuit of a portable electronic device is larger than or equal to a maximum voltage calculated according to the varying battery voltage of the mobile device, the power control circuit provided by the present disclosure always outputs this maximum voltage as the supply voltage. In this manner, even when the control signal which is sent from the baseband circuit of a portable electronic device may be large, it is less likely for the power control circuit provided by the present disclosure to work abnormally because of the insufficient battery voltage of the portable electronic device.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A power control circuit, configured to provide a supply voltage to an output end of the power control circuit, comprising:
   a voltage regulating circuit, configured to couple to a power supply voltage and the output end of the power control circuit, configured to receive a first control signal and output the supply voltage to the output end of the power control circuit according to the first control signal;
   a signal selecting circuit, having a first input end, a second input end, a third input end and an output end, wherein the first input end of the signal selecting circuit is configured to receive a first input signal, the second input end of the signal selecting circuit is configured to receive a second input signal, and the third input end of the signal selecting circuit configured to receive a second control signal; and
   a control circuit, having a first input end, a second input end, a third input end, a first output end and a second output end, wherein the first input end of the control circuit is configured to couple to the power supply voltage, the second input end of the control circuit is configured to receive a predetermined voltage, and the third input end of the control circuit is configured to receive the second input signal;

wherein the first input signal is related to the power supply voltage, one of the first input signal and the second input signal is chosen as the first control signal according to the second control signal, and the first control signal is outputted from the output end of the signal selecting circuit; and the first input signal is outputted from the first output end of the control circuit according to the power supply voltage and the predetermined voltage, and the second control signal is outputted from the second output end of the control circuit according to the first input signal and the second input signal for controlling the signal selecting circuit to choose one of the first input signal and the second input signal as the first control signal and to output the first control signal.

2. The power control circuit according to claim 1, wherein the output end of the power control circuit is coupled to a power amplifier.

3. The power control circuit according to claim 1, wherein the voltage regulating circuit includes:
   a first transistor, having a first end configured to couple to the power supply voltage, and having a second end coupled to the output end of the power control circuit;
   a first operational amplifier, having a non-inverting input end coupled to the output end of the signal selecting circuit, and having a an output end coupled to a third end of the first transistor; and
   a voltage converting circuit, coupled between an inverting input end of the first operational amplifier and the output end of the power control circuit.

4. The power control circuit according to claim 3, wherein the first transistor is a field effect transistor, the first end of the first transistor is a source, the second end of the first transistor is a drain, and the third end of the first transistor is a gate.

5. The power control circuit according to claim 3, wherein the voltage converting circuit includes:
   a first resistor, having one end coupled to an inverting input end of the first operational amplifier and the other end coupled to the second end of the first transistor; and
   a second resistor, having one end coupled to the inverting input end of the first operational amplifier and the other end configured to couple to a reference voltage.

6. The power control circuit according to claim 3, wherein the signal selecting circuit includes:
   a second transistor and a third transistor, wherein a second end of the second transistor is coupled to a second end of the third transistor to receive the second input signal, and a first end of the second transistor is coupled to a first end of the third transistor and is further coupled to the non-inverting input end of the first operational amplifier; and
   a fourth transistor and a fifth transistor, wherein a second end of the fourth transistor is coupled to a second end of the fifth transistor to receive the first input signal, and a first end of the fourth transistor is coupled to a first end of the fifth transistor and is further coupled to the non-inverting input end of the first operational amplifier;
   wherein a third end of the second transistor is coupled to a third end of the fifth transistor to receive the second control signal, and a third end of the third transistor is coupled to a third end of the fourth transistor to receive the second control signal which is inverted by an inverter.

7. The power control circuit according to claim 6, wherein the second transistor and the fourth transistor are first-type field effect transistors, the third transistor and the fifth transistor are second-type field effect transistors, first ends of the second transistor, the third transistor, the fourth transistor and the fifth transistor are drains, seconds ends of the second transistor, the third transistor, the fourth transistor and the fifth transistor are sources, and thirds end of the second transistor, the third transistor, the fourth transistor and the fifth transistor are gates.

8. The power control circuit according to claim 6,
   wherein when the second input signal is larger than or equal to the first input signal, the second control signal outputted from the comparator is at low level and the second control signal inverted by the inverter is at high level, such that the second transistor and the third transistor are turned off, the fourth transistor and the fifth transistor are turned on, and the first input signal is chosen as the first control signal;
   wherein the first control signal is outputted to the non-inverting input end of the first operational amplifier through the fourth transistor and the fifth transistor, such that the first control signal is converted to the supply voltage through the first operational amplifier and the voltage converting circuit, and the supply voltage is outputted from the output end of the power control circuit.

9. The power control circuit according to claim 6, wherein when the second input signal is smaller than the first input signal, the second control signal outputted from the comparator is at high level and the second control signal inverted by the inverter is at low level, such that the second transistor and the third transistor are turned on, the fourth transistor and the fifth transistor are turned off, and the second input signal is chosen as the first control signal;
   wherein the first control signal is outputted to the non-inverting input end of the first operational amplifier through the second transistor and the third transistor, such that the first control signal is converted to the supply voltage through the first operational amplifier and the voltage converting circuit, and the supply voltage is outputted from the output end of the power control circuit.

10. The power control circuit according to claim 1, wherein the control circuit includes:
    a calculation unit, configured to calculate the first input signal according to the power supply voltage and the predetermined voltage, wherein the first input signal equal to a quotient which is the difference of the power supply voltage and the predetermined voltage divided by a converting factor of the voltage converting, and the predetermined voltage is a turn-on voltage of the first transistor; and
    a comparison unit, coupled between the calculation unit and the signal selecting circuit, configured to compare the first input signal and the second input signal and accordingly generate and output the second control signal to the signal selecting circuit.

11. The power control circuit according to claim 10, wherein the calculation unit includes a second operational amplifier, a non-inverting input end of the second operational amplifier is configured to couple to the power supply voltage through a third resistor and is also configured to couple to the reference voltage through a fourth resistor, an inverting input end of the second operational amplifier is configured to couple to the predetermined voltage through another third resistor and is also coupled to the output end of the second operational amplifier through another fourth resistor, and the first input signal is outputted from an output end of the second operational amplifier.

12. The power control circuit according to claim 11, wherein the comparison unit includes a comparator, a first input end of the comparator is coupled to the output end of the second operational amplifier, the second input signal is received by a second input end of the comparator, and the second control signal is generated by the comparator and is transmitted to the signal selecting circuit according to the first input signal and the second input signal.

13. A power control method, applied to a power control circuit, wherein the power control circuit is configured to provide a supply voltage to an output end of the power control circuit and includes a voltage regulating circuit and a signal selecting circuit, wherein the voltage regulating circuit is configured to couple to a power supply voltage and the output end of the power control circuit, the power control circuit further includes a control circuit coupled to the power supply voltage, and the power control method comprises:

through the voltage regulating circuit, receiving a first control signal and outputting the supply voltage to the output end of the power control circuit according to the first control signal;

through the signal selecting circuit, receiving a first input signal, a second input signal and a second control signal, wherein the first input signal is related to the power supply voltage;

through the signal selecting circuit, choosing one of the first input signal and the second input signal as the first control signal according to the second control signal and outputting the first control signal;

through the control circuit, receiving a predetermined voltage and the second input signal; and through the control circuit, calculating the first input signal according to the power supply voltage and the predetermined voltage, and outputting the first input signal.

14. The power control method according to claim 13, further comprising:

through the control circuit, outputting the second control signal according to the first input signal and the second input signal for controlling the signal selecting circuit to choose one of the first input signal and the second input signal as the first control signal.

15. The power control method according to claim 14, wherein the control circuit includes a calculation unit and a comparison unit, the comparison unit is coupled between the calculation unit and the signal selecting circuit, and the power control method comprises:

through the calculation unit, calculating the first input signal according to the power supply voltage and the predetermined voltage, wherein the first input signal equals to a quotient which is the difference of the power supply voltage and the predetermined voltage divided by a converting factor of the voltage converting circuit, and the predetermined voltage is a turn-on voltage of the first transistor.

16. The power control method according to claim 15, further comprising:

through the comparison unit, comparing the first input signal and the second input signal and accordingly generating and outputting the second control signal to the signal selecting circuit.

17. The power control method according to claim 16, further comprising:

through the comparison unit, determining whether the second input signal is larger than or equal to the first input signal.

18. The power control method according to claim 17, further comprising:

when the second input signal is larger than or equal to the first input signal, the first input signal is chosen as the first control signal according to the second control signal generated by the comparison unit, the first control signal is converted to the supply voltage through the first operational amplifier and the voltage converting circuit, and the supply voltage is outputted from the output end of the power control circuit; and when the second input signal is smaller than the first input signal, the second input signal is chosen as the first control signal according to the second control signal generated by the comparison unit, the first control signal is converted to the supply voltage through the first operational amplifier and the voltage converting circuit, and the supply voltage is outputted from the output end of the power control circuit.

* * * * *